(12) United States Patent
Bernard

(10) Patent No.: US 9,332,820 B2
(45) Date of Patent: May 10, 2016

(54) HAIR EXTENSION HOLDER

(71) Applicant: Gwendolyn Bernard, Waterbury, CT (US)

(72) Inventor: Gwendolyn Bernard, Waterbury, CT (US)

(*) Notice: Subject to any disclaimer, the term of this patent is extended or adjusted under 35 U.S.C. 154(b) by 0 days.

(21) Appl. No.: 14/645,151

(22) Filed: Mar. 11, 2015

(65) Prior Publication Data

US 2015/0257515 A1    Sep. 17, 2015

Related U.S. Application Data

(60) Provisional application No. 61/951,752, filed on Mar. 12, 2014.

(51) Int. Cl.
| | |
|---|---|
| *A47F 7/06* | (2006.01) |
| *A47G 25/10* | (2006.01) |
| *A45D 44/02* | (2006.01) |
| *A41G 5/00* | (2006.01) |
| *F16M 11/42* | (2006.01) |
| *F16M 11/28* | (2006.01) |
| *A45D 44/04* | (2006.01) |

(52) U.S. Cl.
CPC ............... *A45D 44/02* (2013.01); *A41G 5/004* (2013.01); *A45D 44/04* (2013.01); *F16M 11/28* (2013.01); *F16M 11/42* (2013.01); *A41G 5/0086* (2013.01)

(58) Field of Classification Search
CPC ....... A54D 44/02; A54D 44/04; A54D 44/14; A47F 5/06; A47F 5/02; A45D 44/02; A45D 44/04; A45D 44/14
See application file for complete search history.

(56) References Cited

U.S. PATENT DOCUMENTS

| 896,990 | A | * | 8/1908 | Hill | F16M 11/00 211/196 |
|---|---|---|---|---|---|
| 1,380,747 | A | * | 6/1921 | Stanford | A47G 29/10 211/1 |
| 1,501,258 | A | * | 7/1924 | Wolfe | A47F 5/06 211/170 |
| 1,941,100 | A | * | 12/1933 | Melaas | A47F 5/06 211/33 |
| 2,152,692 | A | * | 4/1939 | Hereford | A47F 5/04 211/166 |
| 2,270,331 | A | * | 1/1942 | Noble | A41H 31/00 211/13.1 |
| 2,604,214 | A | * | 7/1952 | Fussell | A47F 7/24 211/165 |
| D168,997 | S | * | 3/1953 | Horwitz | 211/59.1 |
| 3,195,736 | A | * | 7/1965 | Bomar, Jr. | A47F 5/05 211/163 |
| 3,726,415 | A | * | 4/1973 | Malik | A47F 5/13 211/169 |
| 4,122,954 | A | * | 10/1978 | Slater | A47F 3/14 108/6 |
| 4,380,296 | A | * | 4/1983 | Murray | A47F 7/005 206/388 |
| 4,848,585 | A | * | 7/1989 | Snyder | A45C 11/16 206/315.11 |
| D330,982 | S | * | 11/1992 | Braun | D6/680.2 |

(Continued)

*Primary Examiner* — Joshua Rodden
*Assistant Examiner* — Kimberley S Wright
(74) *Attorney, Agent, or Firm* — Daniel Boudwin; Global Intellectual Property Agency LLC

(57) ABSTRACT

A hair extension holder is provided. The hair extension holder includes a wheeled base having a base portion and legs extending therefrom. The distal end of each leg has a wheel mounted thereon configured to allow the wheeled base to roll on a floor. The base portion further includes a centrally located flange configured to telescopically receive an upstanding telescopic pole. The telescopic pole is pivotally connected to a holder attachment configured to hold strands of hair extensions. The holder attachment includes opposing face panels and at least one sidewall that connects the opposing face panels along their edges. The opposing face panels include a plurality of fasteners that are aligned in rows, wherein each fastener is configured to hold a separate strand of hair extension.

7 Claims, 2 Drawing Sheets

(56) References Cited

U.S. PATENT DOCUMENTS

| | | | | |
|---|---|---|---|---|
| 5,411,139 A * | 5/1995 | Victory | ............... | A47G 29/10 206/493 |
| 5,704,376 A | 1/1998 | Ogunro | | |
| 6,913,230 B2 * | 7/2005 | Wells | ............... | A45D 44/02 248/127 |
| 6,938,766 B1 * | 9/2005 | Lee | ............... | A47F 5/02 206/388 |
| 7,159,728 B2 * | 1/2007 | Smith | ............... | A45D 44/14 211/115 |
| 7,828,254 B2 * | 11/2010 | Stephens-De Alanis | ............... | A45D 44/00 211/30 |
| 7,946,297 B1 | 5/2011 | Fernandez | | |
| 8,047,851 B1 * | 11/2011 | Baxter | ............... | B43K 23/001 434/408 |
| 8,132,575 B2 | 3/2012 | Tojo et al. | | |
| 8,256,435 B2 | 9/2012 | Croes-Stoffer | | |
| D701,829 S * | 4/2014 | Garrett-Schesch | ............... | D13/102 |
| 8,998,002 B1 * | 4/2015 | Milner | ............... | A47F 7/065 211/13.1 |
| D734,541 S * | 7/2015 | Petruccelli | ............... | D24/128 |
| 2002/0050546 A1 * | 5/2002 | Johnson | ............... | A45D 44/04 248/161 |
| 2004/0020507 A1 | 2/2004 | Johnson | | |
| 2006/0289368 A1 * | 12/2006 | Abney | ............... | A47F 7/065 211/13.1 |
| 2009/0008347 A1 * | 1/2009 | Bell | ............... | A45D 44/02 211/61 |

* cited by examiner

HAIR EXTENSION HOLDER

CROSS REFERENCE TO RELATED APPLICATION

This application claims the benefit of U.S. Provisional Application No. 61/951,752 filed on Mar. 12, 2014. The above identified patent application is herein incorporated by reference in its entirety to provide continuity of disclosure.

BACKGROUND OF THE INVENTION

Field of the Invention

The present invention relates to beauty accessories. More specifically, the present invention pertains to an improved hair extension holder that can be used at home or in a beauty salon. The hair extension holder includes a wheeled base attached to a telescopic pole. The telescopic pole is secured to a holder attachment having a plurality of fasteners that are configured to hold strands of hair extensions.

Hair extensions are lengths of real or artificial hair that can be attached to a person's own natural hair in order to add length and thickness to a person's natural hair. Hair extensions are designed to blend and move naturally with a person's own hair, making it difficult to tell when a person is wearing them. Hair extensions also come in a variety of colors, textures, styles and lengths, which allow a person to change the appearance of his or her hair. For example, a person's naturally curly hair can be made to look straight by adding and integrating straight hair extensions.

Generally, hair extensions are supplied in a form where the hair extensions are attached to a long and thin strip of material. The hair extensions are attached on one end and extend away from the strip of material in a substantially perpendicular manner. The stylist has to select and separate the hair extensions to be braided onto a person's existing hair. In addition, the stylist has to carefully remove the selected hairs and prevent them from entangling or becoming disarranged. This process can be cumbersome and time consuming, especially if the hair extensions become entangled. Therefore, there exists a need for a hair extension holder that prevents separated hair extensions from becoming entangled.

The present invention provides a hair extension holder comprising a wheeled base having a centrally located flange thereon. The base includes legs, wherein a distal end of each leg has a wheel mounted thereon for maneuverability. The centrally located flange is configured to receive an upstanding telescopic pole that has the ability to extend and retract. The telescopic pole is pivotally attached to a holder attachment having opposing side panels. The opposing side panels include a plurality of fasteners aligned in rows configured to hold strands of hair extensions and prevent them from becoming entangled. A user, like a stylist, preemptively selects and separates the strands of hair extensions to be removably positioned on the fasteners. The user then can remove a strand of hair extensions when needed while weaving hair extensions into a person's natural hair.

SUMMARY OF THE INVENTION

In view of the disadvantages inherent in the known types of hair extension holders now present in the prior art, the present invention provides a new and improved hair extension holder wherein the same can be utilized for holding strands of hair extensions and preventing entangling of said strands.

It is therefore an object of the invention to provide a new and improved hair extension holder that has all of the advantages of the prior art and none of the disadvantages.

Another object of the present invention is to provide a new and improved hair extension holder comprising a wheel base having a centrally located flange configured to receive an upstanding telescopic pole.

Yet another object of the present invention is to provide a new and improved hair extension holder, wherein the telescopic pole is pivotally attached to a holder attachment configured to hold strands of hair extensions.

Still yet another object of the present invention is to provide a new and improved hair extension holder, wherein the holder attachment includes opposing face panels having a plurality of fasteners thereon that are aligned in rows.

Another object of the present invention is to provide a new and improved hair extension holder, wherein the plurality of fasteners are configured to hold separate strands of hair extensions and prevent the entangling of the strands.

A further object of the present invention is to provide a new and improved hair extension holder, wherein the telescopic pole is configured to extend and retract to allow for easy storage.

Still yet another object of the present invention is to provide a new and improved hair extension holder wherein the device may be readily fabricated from materials that permit relative economy and are commensurate with durability.

Other objects, features, and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein the numeral annotations are provided throughout.

DETAILED DESCRIPTION OF THE INVENTION

Figure 1:
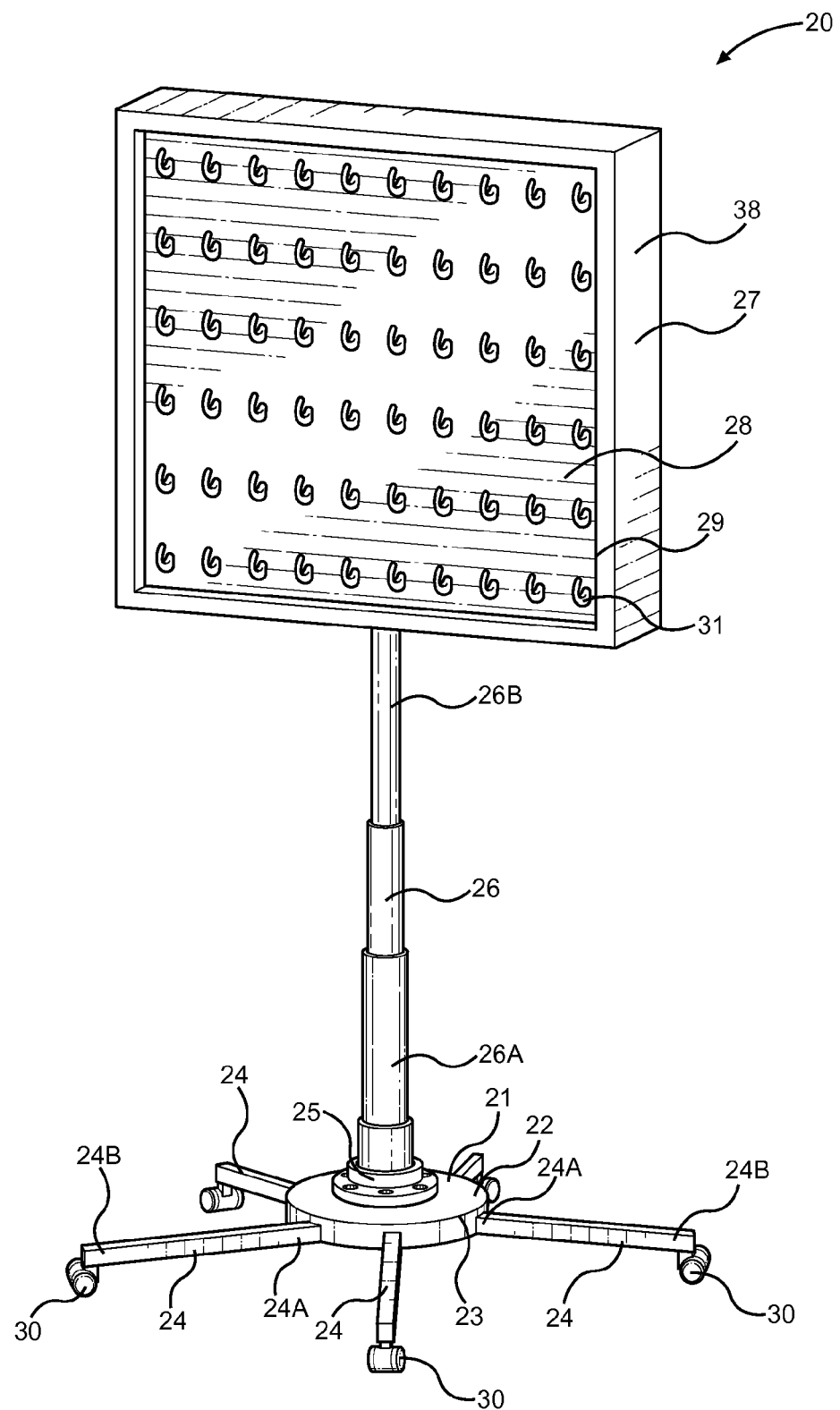
FIG. 1 shows a side perspective of the present invention in an extended position.

References are made herein to the attached drawings. Like reference numerals are used throughout the drawings to depict like or similar elements of the hair extension holder. For the purposes of presenting a brief and clear description of the present invention, the preferred embodiment will be discussed as used to hold strands of hair extensions. The figures are intended for representative purposes only and should not be considered to be limiting in any respect.

Figure 3:
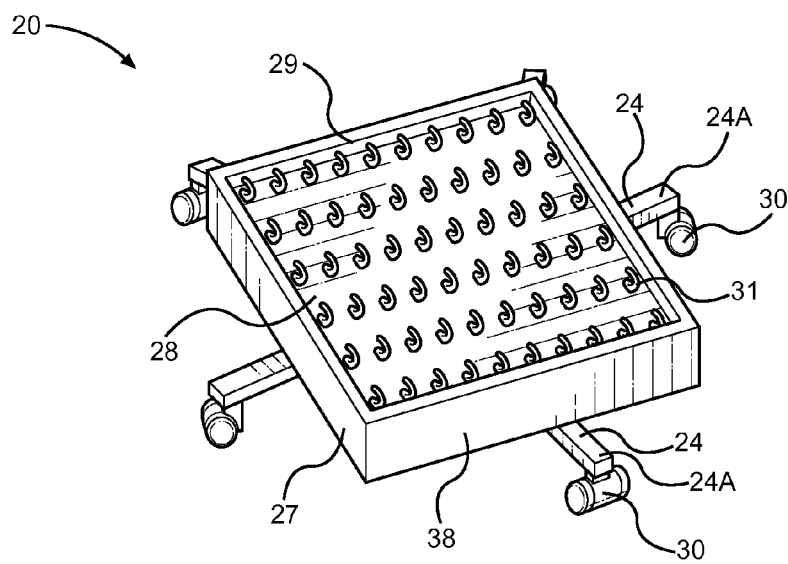
FIG. 3 shows an overhead perspective of the present invention in a fully retracted position.

Referring now to FIGS. 1 and 3, there are shown a side perspective and an overhead perspective of a hair extension holder 20 configured to hold strands of hair extensions. The hair extension holder 20 comprises a wheeled base 21 having a base portion 22 with an outer perimeter 23 and a centrally located flange 25. The base portion 22 is preferably circular, however, the base may include other shapes in alternate embodiments of the present invention. The outer perimeter 23 includes a plurality of legs 24 projecting radially outwardly in a singular plane in relation to the base portion 22. In the illustrated embodiment, the wheeled base includes five legs 24, however, it is recognized that the wheeled base 21 may include any number of legs 24.

Each leg 24 includes a proximal end 24A and a distal end 24B. The proximal end 24A is affixed to the base portion 22 where each leg 24 is positioned equidistantly from one another. The distal end 24B includes a wheel 30 mounted thereon configured to allow the wheel base 21 to roll on a surface. In this manner, the hair extension holder 20 is particularly advantageous to a user, such as a hair stylist, as he or she can roll the hair extension holder 20 to a convenient location to increase efficiency.

The flange 25 is centrally positioned on the wheeled base 21, wherein the flange 25 includes an opening configured to receive an upstanding telescopic pole 26 having a first end 26A and a second end 26B. The first end 26A of the telescopic pole 26 is telescopically received within opening of the flange 25, wherein the first end 26A extends perpendicularly from the wheeled base 21. The telescopic pole 26 includes a series of tubes having progressively smaller diameters nested within each other. The largest diameter tube is on the first end 26A, while the tubes extending therefrom have progressively smaller diameters towards the second end 26B. Preferably, the telescopic pole 26 can be extended and retracted using hydraulic or pneumatic pressure in both directions, however, in alternative embodiments, the telescopic pole 26 can be extended using hydraulic or pneumatic pressure but retracts using external forces.

The second end 26B of the telescopic pole 26 is pivotally secured to a holder attachment 27 configured to hold strands of hair extensions and to prevent entangling of the same. The holder attachment 27 includes one or more face panels thereon. In the illustrated embodiment, the device is shown as having a rectangular construction with a pair of opposing face panels 28, wherein each face panel 28 has an outer edge 29 therealong. The holder attachment 27 further includes at least one sidewall 38 that connects the outer edges of the opposing face panels 28 to one another. Preferably, the opposing face panels 28 are rectangular or square shaped, therefore, needing four sidewalls 38 to connect the face panels 28 to one another. However, it is recognized that the opposing face panels 28 can comprise any suitable shape, including a circle, which would require only one curved sidewall 38.

As shown in FIG. 3, the telescopic pole 26 can be retracted towards the centrally located flange 25 of the base portion 22. The holder attachment 27 is pivotally secured to the telescopic pole 26 by means of a hinge. In this way, when the telescopic pole 26 is fully retracted, the holder attachment 27 can be positioned in substantially a coplanar manner in relation to the base portion 22. In this way, the hair extension holder 20 is particularly advantageous as it provides for easy storage.

The face panels 28 include a plurality of fasteners 31 that are configured to hold strands of hair extensions and prevent entangling of the same. A user is tasked to select and separate a plurality of strands of hair extensions from the original bundle, however, the fasteners 31 are particularly advantageous in that they prevent entangling of already separated strands of hair extensions, thus creating higher efficiency while weaving strands of hair extensions to a person's natural hair. The plurality of fasteners 31 are aligned in a plurality of rows configured to hold a multitude of strands of hair extensions.

Figure 2:
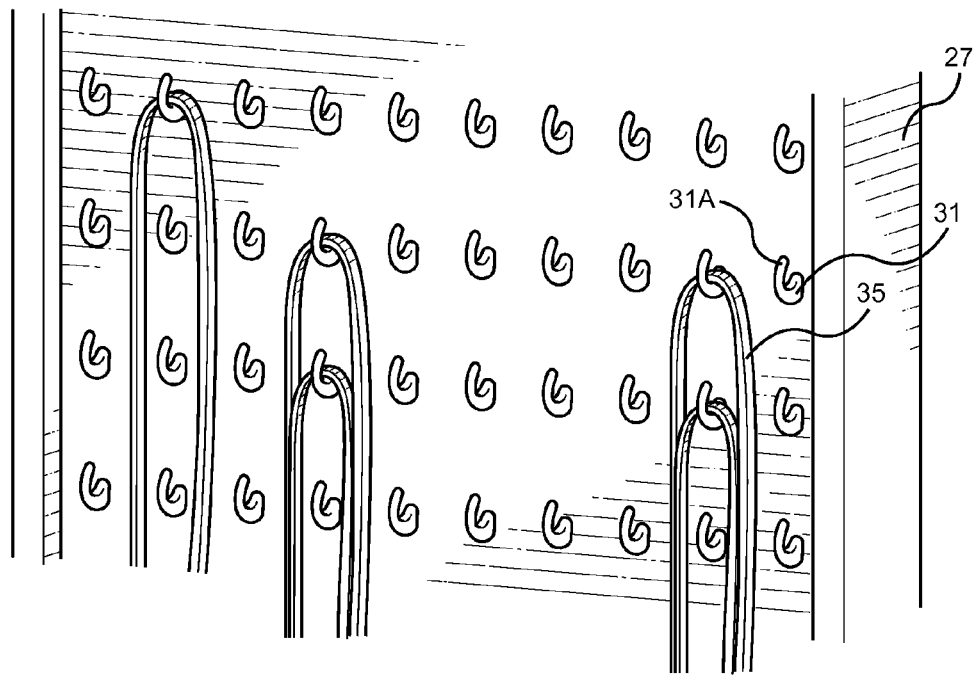
FIG. 2 shows a side perspective of a side panel of a holder attachment of the present invention.

Referring now to FIG. 2, there is shown a side perspective of the holder attachment 27. The fasteners 31 are preferably U-shaped hooks having a first end disposed on an interior surface of the face panel 28 and a second end 31A that extends therefrom forming an interior volume configured to hold a strand 35 of hair extensions. The strand 35 of hair extensions are to be organized so that the interior volume of the fastener 31 can substantially hold the middle of the length of the strand 35 of hair extension. In this way, the fastener 31 can receive and balance the strand 35 of hair extensions thereon and prevent entangling of the same.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above descriptions then, it is to be realized that the optimum dimensional relationships for the parts of the invention, to include variations in size, materials, shape, form, function, and manner of operation, assembly and use, are deemed readily apparent and obvious to one skilled in the art, and all equivalent relationships to those illustrated in the drawings and described in the specifications are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A hair extension holder, comprising:
   a wheeled base having a base portion with an outer perimeter and a centrally located flange;
   said outer perimeter having at least one leg projecting outwardly in a singular plane in relation to said base portion;
   said leg having a proximal end and a distal end;
   wherein said proximal end of each leg is attached to said outer perimeter and said distal end having a wheel mounted thereon configured to allow said wheeled base to roll around on a surface;
   said centrally located flange comprises an opening configured to receive an upstanding telescopic pole having a first end and a second end;
   wherein said first end of said telescopic pole is inserted through said opening of said centrally located flange;
   said second end of said telescopic pole pivotably attached to a holder attachment configured to hold strands of hair extensions;
   said holder attachment comprising a plurality of fasteners configured to separate strands of hair extensions and prevent entangling;
   wherein said holder attachment includes at least one face panel and at least one sidewall connecting said face panel along their edges;
   said plurality of fasteners include hooks that project outwardly and perpendicularly from said face panel;
   wherein said plurality of fasteners configured to hold said strands of hair extensions.

2. The hair extension holder of claim 1, wherein said plurality of fasteners are attached on said face panel to hold strands of hair extensions and prevent entangling.

3. The hair extension holder of claim 1, wherein said plurality of fasteners are aligned in a plurality of rows.

4. The hair extension holder of claim 1, wherein:
   said telescopic pole comprises a series of tubes, whereby said tubes are nested one within another to allow for extension and retraction.

5. The hair extension holder of claim 1, wherein said face panel is planar and said hooks are aligned in a grid pattern so as to prevent hair extensions disposed on a first hook from entangling with hair extensions disposed on a second hook.

6. The hair extension holder of claim 1, wherein said holder attachment includes a first face panel and a second face panel aligned parallel to one another such that a rear side of said first face panel is directed towards a rear side of said second face panel.

7. The hair extension holder of claim 6, wherein said plurality of fasteners include hooks that project outwardly and perpendicularly from said first face panel and said second face panel.

\* \* \* \* \*